United States Patent Office 3,520,885
Patented July 21, 1970

3,520,885
PHENOTHIAZINE SALTS
Oscar Klioze, Richmond, Va., and Kenneth R. Preston, Willowdale, Ontario, Canada, assignors to A. H. Robins Company, Inc., Richmond, Va., a corporation of Virginia
No Drawing. Continuation of application Ser. No. 557,909, June 16, 1966, which is a continuation-in-part of application Ser. No. 495,328, Oct. 12, 1965. This application Apr. 4, 1968, Ser. No. 718,951
Int. Cl. C07d 93/14
U.S. Cl. 260—243                                         2 Claims

ABSTRACT OF THE DISCLOSURE

Mucic acid salt of N-[2-(4'-methylpiperazinyl-1')-propyl]-3-n-butyryl phenothiazine.

---

This is a continuation of Ser. No. 557,909, filed June 16, 1966, now abandoned, which in turn is a continuation-in-part of U.S. application, Ser. No. 495,328, filed Oct. 12, 1965, now abandoned.

The invention relates to insoluble phenothiazine salts characterized by their stability in aqueous media and by the absence of any unpleasant taste and to methods of compounding and using the same. More particularly the invention relates to mucic acid salts of N-[γ-(4'-methylpiperazinyl-1')-propyl]-3-n-butyryl phenothiazine.

N-[γ-(4'-methylpiperazinyl-1')-propyl]-3-n-butyryl phenothiazine has been found to possess an unusual ability to arouse emotionally regressed patients as, for example, the acute and chronic schizophrenic. N-[γ-(4'-methylpiperazinyl-1')-propyl]-3-n-butyryl phenothiazine is effective as a tranquilizer, antidepressant and antiemetic, and constitutes a psycho-active drug having a broad span of activity, and being particularly suited to the treatment of mental depression and anxiety accompanying depression. In addition to N-[γ-(4'-methylpiperazinyl-1')-propyl]-3-n-butyryl phenothiazine, certain pharmaceutically-acceptable acid-addition salts, as, for example, phosphoric, sulfuric, nitric, hydrochloric, hydrobromic, acetic, propionic, sorbic, glutaric, glutamic, adipic, aspartic, fumaric, maleic, and ascorbic acids have been prepared. The free base and the known salts are oxidized relatively quickly in aqueous solutions in which they are soluble. Due to this instability, liquid preparations for oral administration have not as yet been successfully formulated. Further, N-[γ-(4'-methylpiperazinyl-1')-propyl]-3-n-butyryl phenothiazine as is the case with almost all phenothiazines has a persistent unpleasant taste which is difficult to mask by flavoring agents or other devices which are used in the manufacture of oral preparations. The manufacture of a tasteless phenothiazine preparation is of special importance in the treatment of emotionally disturbed patients and particularly in those instances, where, for example, the use of capsules or other like dosage unit forms are not practical.

It is accordingly the general object of the present invention to provide therapeutic compounds comprising N-[γ-(4'-methylpiperazinyl-1')-propyl]-3-n-butyryl phenothiazine which are characterized by substantial water-insolubility.

It is a further object of the present invention to provide therapeutic compounds comprising N-[γ-(4'-methylpiperazinyl-1')-propyl]-3-n-butyryl phenothiazine which are characterized by the absence of any unpleasant taste.

It is still a further object of the present invention to provide therapeutic compositions containing N-[-(4'-methylpiperazinyl-1')-propyl]-3-n-butyryl phenothiazine in the form of its salt with mucic acid.

Another object of the present invention is to provide therapeutic compositions for internal use comprising a mucic acid salt of N-[γ-(4'-methylpiperazinyl-1'-)-propyl]-3-n-butyryl phenothiazine.

Other objects will be apparent to those skilled in the art in view of the following disclosure:

In accordance with the invention, it has now been found that N-[γ-(4'-methylpiperazinyl-1')-propyl]-3-n-butyryl phenothiazine salts with mucic acid fully satisfy all of the requirements for a stable and tasteless drug. The salts are generally formed in the form of their hydrates and particularly dihydrates and the term "salt" as used herein is generically intended to include such hydrates.

The new mucic acid salts are substantially insoluble in water and therewith stable in its presence and because they are substantially completely insoluble they do not produce a perceptible taste sensation to the tongue. The active substance is rapidly released in the body and, further, the salt per se, as well as the salt-forming compound, is readily tolerated.

The novel mucic salts of this invention are preferably prepared by the reaction of an aqueous solution of a neutral alkali metal salt of mucic acid, such as disodium mucate, with a neutral salt of N-[γ-(4'-methylpiperazinyl-1')-propyl]-3-n-butyryl phenothiazine, such as the diphosphate.

The concentration of the neutral alkali metal mucate in the reaction solution may vary from 0.001 to 0.20 molar and is preferably 0.02 to 0.10 molar. The molar concentration of the neutral phenothiazine salt in the reaction solution should be essentially the same as the molar concentration of the mucate salt. The reaction solution is then approximately neutral.

Other metal salts of mucic acid will suffice, such as the dipotassium, dilithium, etc., salts. Other neutral salts of the phenothiazine will suffice, such as the dinitrate, disulfate, etc. The mixture is simply allowed to stand until the mucate precipitates, and the precipitated salt is filtered and purified by recrystallization, as for example recrystallization using a water-acetonitrile solution. The salt is recovered in this manner in the form of its dihydrate and may be used in this form.

It is also possible to form the salts in accordance with the invention by treating N-[γ-(4'-methylpiperazinyl-1')-propyl]-3-n-butyryl phenothiazine in the form of its free base dissolved in a suitable solvent, such as a lower alcohol with an aqueous solution of the mucic acid, as for example, by admixing a boiling solution of the components and allowing the reaction mixture to cool causing precipitation of the salt which may be recovered by filtration and purified by recrystallization.

The N-[γ-(4'-methylpiperazinyl-1')-propyl]-3-n-butyryl phenothiazine starting material may be produced from the corresponding butyrylated phenothiazine of the formula:

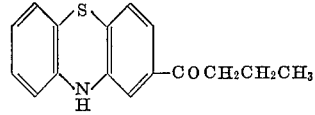

or from its corresponding derivative in which the carbonyl group is closed, by converting these butyrylated phenothiazines into their metal compounds, such as their sodium or potassium compounds and by reacting the latter with reactive esters of basic alcohols having the formula:

in which A represents the propylene radical and Z is methylpiperazinyl.

Alternatively, the metalization of the butyrylated phenothiazine or its functional derivative may be effected with the use of at least two equivalents of a useful metal donor and the basic alkylation may be effected with an equivalent amount of a salt of the reactive ester of the basic alcohol without the aid of an additional acid acceptor at elevated temperature with or without solvent and under pressure if necessary.

It is also possible to produce the starting phenothiazine derivative in accordance with the invention by reacting the butyrylated phenothiazine having the above-mentioned formula with the active esters of basic alcohols as set forth above without an additional acid liberating agent at elevated temperatures with or without solvents and possibly under pressure.

As an alternative method of producing the phenothiazine in accordance with the invention, the initial butyrylated phenothiazine having the above-designated formula or its functional derivative may be reacted with compounds of the acrylonitrile type or with reactive esters of alcohols which in place of the tertiary amino group having a substituent convertible into an amino group as, for example, a hydroxyl group or possibly a protected amino group, a halogen atom, or a carbonamide group and by effecting the conversion into the compound in accordance with the invention by resorting to conventional methods.

The invention is illustrated by the following examples but it is to be understood that the same are presented only for the purpose of illustration and not as indicating limits of the invention.

EXAMPLE 1

Mucic acid (4.9 g., 0.0234 mol) was dissolved in 150 ml. of water containing 2.0 g. (0.050 mol) of sodium hydroxide. The solution was added to 15 g. (0.0247 mol) of N-[γ-(4′-methylpiperazinyl-1′)-propyl]-3-n-butyryl phenothiazine diphosphate in 350 ml. of water. The resulting mixture stood overnight and was filtered. Yield 12.5 g. M.P. 115–126° C. Recrystallized three times from water-acetonitrile solution. Yield 6.0 g. M.P. 124–129° C.

*Analysis.*—Calculated for $C_{30}H_{41}N_3O_9S \cdot 2H_2O$ (percent): C, 54.95; H, 6.92; N, 6.41; $H_2O$, 5.49. Found (percent): C, 55.11; H, 7.05; N, 6.30; $H_2O$, 5.66.

The recovered salt was N-[γ-(4′-methylpiperazinyl-1′)-propyl]-3-n-butyryl phenothiazine mucate dihydrate.

EXAMPLE 2

Mucic acid (1.078 g.) was dissolved in 75 ml. of boiling water. N-[γ-(4′-methylpiperazinyl-1′)-propyl]-3-n-butyryl phenothiazine as free base (2.1 g.) was dissolved in 20 ml. of 95% ethanol. The N-[γ-(4′-methylpiperazinyl-1′)-propyl]-3-n-butyryl phenothiazine solution was then added to the boiling solution of mucic acid with stirring. This mixture was allowed to cool and was stirred continuously for one hour. The precipitate was filtered and recrystallized from methanol three times. The melting point of this salt was 126 to 128° C.

EXAMPLE 3

Example 2 was repeated but in this instance methanol was employed as a solvent for the N-[γ-(4′-methylpiperazinyl-1′)-propyl]-3-n-butyryl phenothiazine. The resulting crystals were identical to the product described in Example 2.

Perchloric acid titration indicated a one-to-one ratio of acid to base. Acid and base titrations also indicated a one-to-one ratio. As compared to the existing salts, the N-[γ-(4′-methylpiperazinyl-1′)-propyl]-3-n-butyryl phenothiazine mucate was approximately one hundred times less soluble than N-[γ-(4′-methylpiperazinyl-1′)-propyl]-3-n-butyryl phenothiazine phosphate and twenty times less soluble than N-[γ-(4′-methylpiperazinyl-1′)-propyl]-3-n-butyryl phenothiazine. Using the hypothesis that oxidation liability is relatively proportional to solubility, then the mucic acid salt of N-[γ-(4′-methylpiperazinyl-1′)-propyl]-3-n-butyryl phenothiazine should be substantially less susceptible to oxidation in an aqueous media.

The salts are administered in various dosage forms, i.e., the desired results may be accomplished by oral, intramuscular, or subcutaneous administration. Obviously, in treatment of patients suffering from mental disorders, oral administration is preferred. However, it should be emphasized that, regardless of the dosage form, these are acid addition salts, and the effective dosage is to be calculated on the basis of the free phenothiazine.

In all, the following has been observed with respect to dosage:

Strict individualization of dosage is a necessity. In general, 30–60 mg. per day seem to suffice for most schizophrenic patients. However, it has been found in at least two investigations, doses as low as 10–20 mg./day have seemed optimum. Since the compound per se has been given with impunity in doses up to 300 mg., the same latitude can be exercised by the prescribing physician where present patient symptomotology warrants a trial at a higher dosage level.

We claim:
1. Mucic acid salt of N-[2-(4′-methylpiperazinyl-1′)-propyl]-3-n-butyryl phenothiazine.
2. Salt according to claim 1 in the form of the dihydrate.

References Cited

UNITED STATES PATENTS 3,023,146  2/1962  Tislow.
3,176,015  3/1965  Jacob.

FOREIGN PATENTS 576,312  3/1946  Great Britain.

OTHER REFERENCES

Mandel, Amer. Jour. of Psychiatry, 119, pp. 70–71, 1962.

HENRY R. JILES, Primary Examiner

HARRY I. MOATZ, Assistant Examiner

U.S. Cl. X.R.

424—247

PO-1050
(5/69)

UNITED STATES PATENT OFFICE
CERTIFICATE OF CORRECTION

Patent No. 3,520,885      Dated July 21, 1970

Inventor(s) OSCAR KLIOZE and KENNETH R. PRESTON

It is certified that error appears in the above-identified patent and that said Letters Patent are hereby corrected as shown below:

Column 1, line 69, "N-[4'-" should be -- N-[γ-4'- --; column 4, line 12, after " phenothiazine" insert --maleate--

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents